Oct. 3, 1933.   J. A. BRIED   1,928,643
ELECTRIC HEATER
Filed Aug. 16, 1927
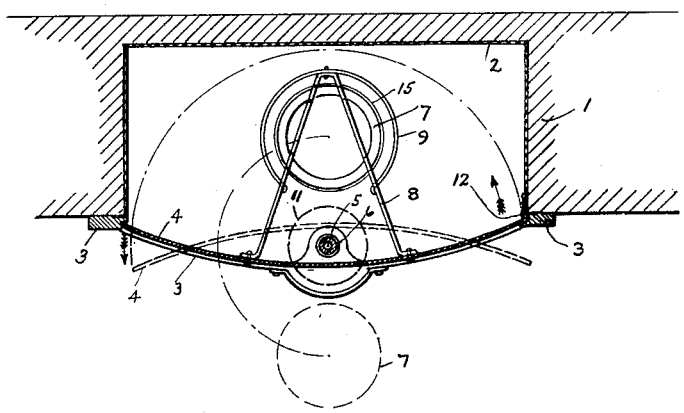
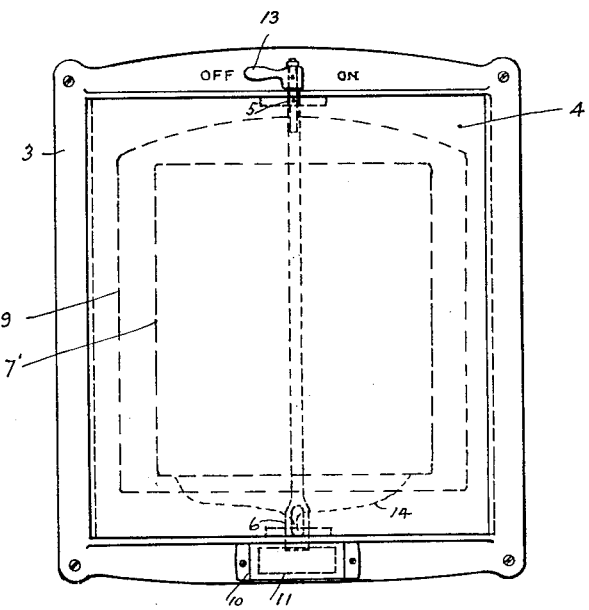
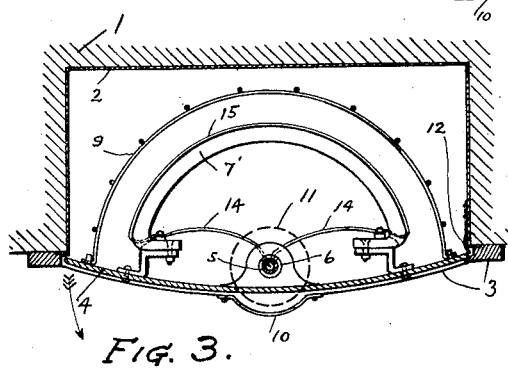
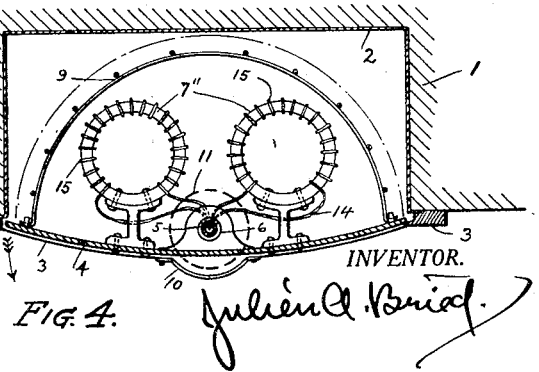
INVENTOR.
Julien A. Bried Patented Oct. 3, 1933

1,928,643

UNITED STATES PATENT OFFICE 1,928,643

ELECTRIC HEATER

Julien A. Bried, Oakland, Calif.

Application August 16, 1927. Serial No. 213,385

20 Claims. (Cl. 219—34)

This invention has to do with electric wall recess type of heaters which are mounted in the wall of a room so as to heat the room when the heating element is energized.

The objects of the invention are to provide a heater of this type which may be entirely closed up within the wall recess so as to keep out dust and dirt when the heater is not in use, and which will carry out in a different way the advantages of this type of heater as against the construction of a similar heater shown in my companion application for patent filed simultaneously herewith under Serial No. 213,384 on August 16, 1927.

In the present construction I likewise bring the heating element out of the recess upon opening the door, and also provide means whereby the heater is inoperative except when the door is open and the element out of the recess.

In the drawing hereto Fig. 1 is a sectional plan view of a wall recess with my heater installed, Fig. 2 is a front elevation of my heater, Fig. 3 a sectional view similar to Fig. 1 but showing a variation in the form of the heating element, Fig. 4 is a similar sectional view showing the use of two heating elements.

Briefly described my invention comprises providing a recess in the wall large enough to freely receive the electric heating element, and of mounting the element upon a door arranged to close the mouth of the recess and to open so as to carry outward with it the heating element, so that the element will stand out of the recess and its heat will be free to ascend in front of the wall, thereby avoiding all necessity of providing cooling air flues within the recess to keep from overheating the wall, as used in many wall recess type of electric heaters at present, and most important is the provision of means whereby the circuit is broken so that the heating element is inoperative when it is within the wall recess, so that it is impossible to energize it when the door is closed over it.

In carrying out my invention I prefer to use the hollow vertical flue type of electric heating element comprising a flue of insulating material on which is wound the resistance or heating coils, tho it is feasible to use any of the other well known types of electric heating elements if desired.

In the drawing the figures show at 1 a wall with a recess formed therein preferably lined with a sheet metal box as at 2 provided with a facing frame 3 secured to the trim or face of the wall. The recess is closed by a door 4 vertically pivoted at 5 and 6 respectively to the upper and lower portion of the frame so as to be revoluble and reversible in the mouth of the recess.

The portions of the frame in which the door pivots operate take the form of forwardly projecting flanges as shown in Fig. 2 and they are arched forwardly so as to bring the pivots outwardly of the wall or face of the recess as clearly shown in Fig. 1.

The door is preferably of sheet metal and arched slightly as shown so as to follow the curve of the upper and lower flanges of the frame between which it revolves, and the electric heating element, shown in Fig. 1 as a vertically arranged cylinder 7, is spacedly supported from the inner face of the door, preferably by brackets as at 8 at top and bottom of the element suitably notched to engage the edges of the element to retain same in place. Surrounding the element is a wire or other protective grill as at 9 supported by the brackets or by the door.

The door is fixed to its pivots and revolves a half turn only in direction of the arrows to the dotted position shown in Fig. 1 and thereby carries the element 7 out of the recess so that it stands as a vertical flue spaced forward of the wall so that its heat is free to ascend in front of the wall for heating the air of the room. The upper pivot, or upper end of the pivot 5 is extended through the upper forwardly arched flange of the frame 3 and is provided with a lever handle as at 13 arranged to indicate the "on" and "off" positions upon giving it and thereby the door a half turn.

The lower pivot 6 of the door passes downwardly into a switch box 10 containing a snap switch 11 of any approved type not detailed and to which the pivot is operatively connected so that upon opening the door the switch will be thrown on or closed, and when closing the door it will be thrown off. The desirable setting being that the switch operate at the last portion of the opening movement of the door, and the first portion of the closing movement, so that it will close a circuit just as the door is fully open, and will break the circuit shortly after it begins a closing movement.

The lower pivot 6 is preferably hollow for passage of circuit wires 14 from the coils of the heating element to the source of electric energy controlled by the switch, and both pivots are preferably made as a continuous tube or bar to insure direct operation of the switch 11 upon turning of the handle 13.

When the door is opened to the dotted position shown in Fig. 1 it is preferably stabilized by the snap switch to which it is connected, and it should be observed that the door when in this position stands with its vertical edges slightly spaced away from the frame, so that the door warmed by the element conveys little or no heat to the frame 3 to be absorbed and wasted thereby. This spacing of the door is due to the forward setting of the pivot relative to the door seating edges of the frame.

When the door is closed it may also be held in stabilized condition by the usual action of the snap switch, or by a small spring clip at the edge of the door as indicated at 12.

In order to install as large an element on the door as possible, the element instead of being of circular or pipe form as in Fig. 1 may be of oval or arched form as shown at 7' in Fig. 3, the rear wall of the oval being omitted adjacent the door as unnecessary. The electric heating coils indicated at 15 may of course be wound on the outside of the supporting portion of the element, or both outside and inside, inside only, or imbedded, as variously done in the art heretofore, and as stated the support for the coils may be of any kind of insulating construction.

Instead of the single round pipe-like element of Fig. 1 or the arch-shaped element of Fig. 3 a plurality of pipe-shaped elements as at 7'' in Fig. 4 may be mounted on the door provided they come within the clearance for revolving the door as indicated.

The door, it should be noted, when the element is closed within the recess seats against the frame so that it can only be given a half rotation in the direction of the arrows to bring the element out.

In contemplating my invention it should be observed that a vertical flue electric heating element is provided which is closed in a recess in inoperative position by a door, and that when the door is swung open it brings mounted upon it the electric element and positions same in operative position forward of the front wall of the recess so that its heat can freely ascend in front of the recess and by this arrangement no heat can be generated within the recess as the element cannot be energized therein.

I claim:—

1. An electric room heater comprising a door arranged in front of a recess for closing the same, an electric heating element of the air heating type mounted on the door for closing into the recess and standing forward of the recess on the door when the door is open, means whereby said door may be swung from a vertical closed position, to a vertical open position with the heater on its outer face in the open position whereby the air may freely rise up through the heater in front of the recess for heating the room.

2. An electric heater comprising a door vertically pivoted so as to be reversible over a recess to close the same, an electric heating element mounted on one side of the door so as to be enclosed within the recess when the door is turned one side out, and to stand in front of the recess when the door is reversed, whereby the heat of the element when energized may ascend in front of the recess.

3. In a structure as specified in claim 2, means for rendering said element electrically inoperative when enclosed within the recess by said door.

4. In a structure as specified in claim 2, means operated by said door for rendering said element electrically inoperative when enclosed within the recess by said door.

5. In a structure as specified in claim 2, said door when in reversed position providing a ventilating space to the recess adjacent the edge of the door.

6. In a structure as specified in claim 2, said door being arched with concave side toward said element.

7. In a structure as specified in claim 2, said door being arched with concave side toward said element and arranged so that it will provide an open space to the recess adjacent its edges when the door is reversed.

8. An electric heater comprising a door vertically pivoted to cover the mouth of a recess, an electric heating element supported on the inner face of the door, a circuit switch for said element operatively connected to the door so arranged that upon swinging the door to bring the element out of the recess, said switch will close.

9. An electric heater comprising a door vertically pivoted to cover the mouth of a recess, an electric heating element supported on the inner face of the door, a circuit switch for said element operatively connected to the door so arranged that upon swinging the door to bring the element out of the recess, said element will be energized.

10. A combination as specified in claim 9 plus that a closing movement of said door will break said circuit and said element will be de-energized.

11. In a recess type electric room heater, a door covering said recess, an electric heating element of the air heating type mounted on said door and a guard for said element carried by said door spaced outwardly from said element arranged to permit a free flow of air upward between the element and guard when the door is open, said element and its guard adapted to swing into the recess when the door is closed.

12. In a recess type electric room heater, a door provided with a concavely curved inner side and pivoted to cover said recess, and an electric heating element mounted on the concavely curved inner side of said door to swing in and out of the recess upon swinging the door.

13. In a recess type electric heater, a door pivoted to cover said recess, and an outwardly arched electric heating element secured to said door and forming with the same a vertical flue.

14. A vertically pivoted door, an electric heating element mounted on one side thereof and spaced therefrom to provide a vertical flue between the element and door.

15. An electric heater comprising a door vertically pivoted to cover the mouth of a recess, an electric heating element mounted on the inner face of the door, and a handle connected to said door for operating the same accessible outside of the recess with either face of the door turned outward.

16. An electric heater arranged to move into and out of a recess, a door vertically pivoted to close the recess, a handle on the pivot of said door extending substantially in the plane of the door adapted for swinging the door substantially a half revolution.

17. In a structure as specified in claim 16, means preventing said door from swinging more than a half revolution.

18. In an electric room heater of the wall recess type, a fixed frame around the mouth of the recess, a door for closing the recess, a pivot pivoting the door to the frame, an electric air heating element, means mounting the element adjacent to the inner side of the door to swing with the door and to be within the recess when the door is closed, and a handle secured to the pivot of the door arranged to be accessible in front of the frame for swinging the door.

19. In an electric heater of the wall recess type, a fixed frame around the mouth of the recess, flanges at opposite edges of the frame projecting forwardly therefrom, a door adapted for closing the recess positioned between said flanges, means pivoting said door centrally to opposite points on said flanges for reversing by swinging through the recess, an electric air heating element, and means mounting said element adjacent the inner side of said door to swing with the door and be within the recess when the door is closed.

20. In a structure as specified in claim 18, said door being centrally pivoted to the frame for reversing in the frame, and said handle being on the upper end of the pivot above the door.

JULIEN A. BRIED.